United States Patent
Kim et al.

(10) Patent No.: US 12,515,197 B2
(45) Date of Patent: Jan. 6, 2026

(54) SUPER ABSORBENT POLYMER COMPOSITION AND PREPARATION METHOD THEREOF

(71) Applicant: LG Chem, Ltd., Seoul (KR)

(72) Inventors: Sujin Kim, Daejeon (KR); Jun Kyu Kim, Daejeon (KR)

(73) Assignee: LG Chem, Ltd., Seoul (KR)

( * ) Notice: Subject to any disclaimer, the term of this patent is extended or adjusted under 35 U.S.C. 154(b) by 1182 days.

(21) Appl. No.: 17/424,654

(22) PCT Filed: Aug. 6, 2020

(86) PCT No.: PCT/KR2020/010385
§ 371 (c)(1),
(2) Date: Jul. 21, 2021

(87) PCT Pub. No.: WO2021/066313
PCT Pub. Date: Apr. 8, 2021

(65) Prior Publication Data
US 2022/0088569 A1    Mar. 24, 2022

(30) Foreign Application Priority Data

Sep. 30, 2019    (KR) .................. 10-2019-0121171

(51) Int. Cl.
| | |
|---|---|
| B01J 20/26 | (2006.01) |
| B01J 20/28 | (2006.01) |
| B01J 20/30 | (2006.01) |

(52) U.S. Cl.
CPC ....... B01J 20/267 (2013.01); B01J 20/28016 (2013.01); B01J 20/3021 (2013.01); B01J 20/3085 (2013.01)

(58) Field of Classification Search
None
See application file for complete search history.

(56) References Cited

U.S. PATENT DOCUMENTS

| | | | |
|---|---|---|---|
| 5,633,316 A | 5/1997 | Gartner et al. | |
| 2010/0119312 A1* | 5/2010 | Nagashima | A61L 15/60 523/111 |
| 2011/0301027 A1 | 12/2011 | Bitis et al. | |
| 2013/0101851 A1 | 4/2013 | Takaai et al. | |
| 2013/0102750 A1* | 4/2013 | Watanabe | C08F 6/008 526/318.41 |
| 2014/0031473 A1 | 1/2014 | Nogi et al. | |
| 2014/0042364 A1* | 2/2014 | Nogi | B01J 20/28085 525/329.7 |
| 2015/0273433 A1* | 10/2015 | Nakatsuru | C08J 3/075 252/194 |
| 2015/0299404 A1 | 10/2015 | Daniel et al. | |
| 2017/0014801 A1* | 1/2017 | Ikeuchi | A61L 15/425 |
| 2018/0037686 A1* | 2/2018 | Lee | C08J 3/12 |
| 2019/0010297 A1* | 1/2019 | Lee | C08K 11/00 |
| 2019/0100629 A1 | 4/2019 | Nam et al. | |
| 2019/0119452 A1* | 4/2019 | Yoon | C08F 20/06 |
| 2019/0134603 A1* | 5/2019 | Kim | C08J 3/245 |
| 2019/0233548 A1 | 8/2019 | Kajikawa et al. | |
| 2019/0338082 A1 | 11/2019 | Iwamura et al. | |
| 2019/0344243 A1 | 11/2019 | Lee et al. | |
| 2020/0009529 A1 | 1/2020 | Nam et al. | |
| 2021/0230377 A1 | 7/2021 | Lee et al. | |

FOREIGN PATENT DOCUMENTS

| | | | |
|---|---|---|---|
| CN | 101490139 A | 7/2009 | |
| CN | 107141399 A | 9/2017 | |
| CN | 107822779 A | 3/2018 | |
| CN | 108884233 A | 11/2018 | |
| CN | 109923157 A | 6/2019 | |
| EP | 2669318 A1 | 12/2013 | |
| EP | 3540001 A1 | 9/2019 | |
| JP | 2012512739 A | 6/2012 | |
| JP | 5722921 B2 | 5/2015 | |
| JP | 6157853 B2 | 7/2017 | |
| KR | 100195778 B1 | 6/1999 | |
| KR | 20150067218 A | 6/2015 | |
| KR | 20180040404 A | 4/2018 | |
| KR | 20180074586 A | 7/2018 | |
| KR | 20190075574 A | 7/2019 | |
| WO | 2012102407 A1 | 8/2012 | |
| WO | 2018062539 A1 | 4/2018 | |
| WO | WO-2018117548 A1 * | 6/2018 | ........... A61L 15/425 |
| WO | 2019117482 A1 | 6/2019 | |

OTHER PUBLICATIONS

Japanese Industrial Standard, "Testing method for water absorption rate of super absorbent polymers", Mar. 1996, JIS K-7224, pp. 1-4.
Third Party Observation for Application No. PCT/KR2020/010385 submitted Jan. 27, 2022, 3 pgs.
Zhenghong, W. et al., "China Medical Science and Technology Press" Publishing house, Apr. 2020, pp. 1-4. Machine generated translation is attached.
Search Report dated Apr. 21, 2023 from the Office Action for Chinese Application No. 202080010794.3 issued Apr. 22, 2023, pp. 1-3. [See p. 1, categorizing the cited references].
International Search Report for Application No. PCT/KR2020/010385, mailing Nov. 16, 2020, 4 pages.
Odian, George, Principles of Polymerization, Second Edition, published Oct. 1981, p. 203, John Wiley & Sons, Inc., USA.
Schwalm, Reinhold, "UV Coatings; Basics, Recent Developments and New Applications", Dec. 2006, p. 115, Elsevier Science.

* cited by examiner

*Primary Examiner* — Joseph D Anthony
(74) *Attorney, Agent, or Firm* — Lerner David LLP

(57) ABSTRACT

There are provided a superabsorbent polymer composition and a method for preparing the same, more specifically, a superabsorbent polymer composition exhibiting excellent absorption performance and a method for preparing the same.

3 Claims, No Drawings

SUPER ABSORBENT POLYMER COMPOSITION AND PREPARATION METHOD THEREOF

CROSS-REFERENCE TO RELATED APPLICATION(S)

The present application is a national phase entry under 35 U.S.C. § 371 of International Application No. PCT/KR2020/010385, filed on Aug. 6, 2020, which claims priority to Korean Patent Application No. 10-2019-0121171, filed on Sep. 30, 2019, the disclosures of which are herein incorporated by reference in their entirety.

TECHNICAL FIELD

This disclosure relates to a superabsorbent polymer composition exhibiting excellent absorption performance and a method for preparing the same.

BACKGROUND ART

Super absorbent polymer (SAP) is synthetic polymer material that can absorb moisture of 500 to 1000 times of self-weight, and is also named differently as super absorbency material (SAM), absorbent gel material (AGM), etc. according to developing companies. The superabsorbent polymer began to be commercialized as sanitary items, and currently, it is being widely used as hygienic goods such as a disposable diaper and the like, water-holding material for soil, water stop material for civil engineering and architecture, sheets for raising seedling, freshness preservatives in the field of food circulation, fomentation material, and the like.

In most cases, such superabsorbent polymer is being widely used in the field of hygienic goods such as a diaper or sanitary pad, etc., and for such use, it is required to exhibit high absorption power to moisture, and the like, and the absorbed moisture should not escape even under external pressure, and besides, it should properly maintain the shape even when it absorbs water and the volume is expanded (swollen), thus exhibiting excellent permeability.

However, it is known that centrifuge retention capacity (CRC) indicating the basic absorption power and water retention power of superabsorbent polymer, and absorption under load (AUL) indicating the property of retaining absorbed moisture despite the external pressure are difficult to be simultaneously improved. In case the whole crosslinking density of superabsorbent polymer is controlled low, centrifuge retention capacity may become relatively high, but the crosslink structure may become loose, and gel strength may decrease, thus deteriorating absorption under pressure. To the contrary, in case the crosslinking density is controlled high to improve absorption under pressure, it may become difficult to absorb moisture between the dense crosslink structures, thus deteriorating centrifuge retention capacity. For these reasons, there is a limit in providing superabsorbent polymer having simultaneously improved centrifuge retention capacity and absorption under pressure.

However, with the recent thinning of hygienic goods such as diapers and sanitary pads, superabsorbent polymer is required to have higher absorption performances. Among them, it is an important problem to simultaneously improve the conflicting properties of centrifuge retention capacity and absorption under pressure, and improve permeability, and the like.

And, after superabsorbent polymer applied for hygienic goods such as diapers or sanitary pads, and the like absorb liquid, the surface may become wet, thus giving unpleasant feel, and in order to prevent this, the superabsorbent polymer is required to exhibit rapid initial absorption speed. As the initial absorption speed is rapider, even after swollen by liquid, the dry state of the surface is maintained, and thus, more pleasant use condition may be maintained.

In general, the absorption speed can be improved by broadening the surface area of superabsorbent polymer. For example, a method of forming a porous structure on the surface of superabsorbent polymer particles using a blowing agent, or reducing a chopper hole size is being applied. However, in this case, the amount of fine particles generated in the product may increase, and the strength of superabsorbent polymer may be lowered, thus causing property deterioration.

Thus, there is a continuous demand for studies on methods for improving the initial absorption speed while minimizing property deterioration according to increase in fine powder content.

DETAILED DESCRIPTION OF THE INVENTION

Technical Problem

Thus, it is an object of the invention to provide a superabsorbent polymer composition and a method for preparing the same, by using specific compounds in combination in the step of surface crosslinking.

Technical Solution

In order to achieve the object, there is provided
a method for preparing a superabsorbent polymer composition comprising the steps of:
conducting crosslinking polymerization of water soluble ethylenically unsaturated monomers having acid groups of which at least a part are neutralized, in the presence of an internal crosslinking agent, to form hydrogel polymer;
drying, grinding and classifying the hydrogel polymer to obtain base resin powder; and
surface crosslinking the base resin powder in the presence of a surface crosslinking solution comprising a cyclic carbonate-based surface crosslinking agent and sodium dodecyl sulfate to form superabsorbent polymer particles.

There is also provided a superabsorbent polymer composition prepared by the above described method.

Specifically, the superabsorbent polymer composition comprises superabsorbent polymer particles comprising crosslinked polymer of water soluble ethylenically unsaturated monomers having acid groups of which at least a part are neutralized, and
further comprises a surface crosslink layer formed by additional crosslinking of the crosslinked polymer by a cyclic carbonate-based surface crosslinking agent and sodium dodecyl sulfate, on at least a part of the surfaces of the superabsorbent polymer particles.

Advantageous Effects

According to the present disclosure, a superabsorbent polymer composition exhibiting excellent absorption performance can be prepared.

DETAILED DESCRIPTION OF THE EMBODIMENTS

The terms used herein are only to explain specific embodiments, and are not intended to limit the invention.

A singular expression includes a plural expression thereof, unless it is expressly stated or obvious from the context that such is not intended. As used herein, the terms "comprise" or "have", etc. are intended to designate the existence of practiced characteristic, number, step, constructional element or combinations thereof, and they are not intended to preclude the possibility of existence or addition of one or more other characteristics, numbers, steps, constructional elements or combinations thereof.

As used herein, terms "a first", "a second", "a third", and the like are used to explain various constructional elements, and they are used only to distinguish one constructional element from other constructional elements.

Although various modifications can be made to the present invention and the present invention may have various forms, specific examples will be illustrated and explained in detail below. However, it should be understood that these are not intended to limit the present invention to specific disclosure, and that the present invention includes all the modifications, equivalents or replacements thereof without departing from the spirit and technical scope of the invention.

As used herein, the term "polymer" means the polymerized state of water-soluble ethylenically unsaturated monomers, and may include those of all moisture content ranges or particle diameter ranges. Among the polymers, those having moisture content of about 40 wt % or more after polymerized and before dried may be designated as hydrogel polymer, and the ground and dried particles of such hydrogel polymer may be designated as crosslinked polymer.

And, the term "superabsorbent polymer particles" mean particulate matters comprising crosslinked polymer that is polymerized from water soluble ethylenically unsaturated monomers having acid groups of which at least a part are neutralized, and crosslinked by an internal crosslinking agent.

And, the term "superabsorbent polymer" means crosslinked polymer polymerized from water soluble ethylenically unsaturated monomers having acid groups of which at least a part are neutralized, or base resin in the form of powders consisting of superabsorbent polymer particles formed by grinding of the crosslinked polymer according to the context, or it is used to include those made to be appropriate for productization through additional processes, for example, surface crosslinking, particle reassembly, drying, grinding, classification, etc. of the polymer or base resin. Thus, the term "superabsorbent polymer composition" may be interpreted as a composition comprising superabsorbent polymer, namely plural superabsorbent polymer particles.

Hereinafter, a method for preparing superabsorbent polymer and superabsorbent polymer according to specific embodiments of the invention will be explained in detail.

A Method for Preparing a Superabsorbent Polymer Composition

According to one embodiment of the invention, there is provided a method for preparing a superabsorbent polymer composition comprising the steps of: conducting crosslinking polymerization of water soluble ethylenically unsaturated monomers having acid groups of which at least a part are neutralized, in the presence of an internal crosslinking agent, to form hydrogel polymer; drying, grinding and classifying the hydrogel polymer to obtain base resin powder; and surface crosslinking the base resin powder in the presence of a surface crosslinking solution comprising a cyclic carbonate-based surface crosslinking agent and sodium dodecyl sulfate to form superabsorbent polymer particles.

In the conventional products for which superabsorbent polymer is applied, in order to improve absorption speed, a method of broadening the surface area of superabsorbent polymer is used, and for example, a method of forming a porous structure on the surface of superabsorbent polymer particles using a blowing agent or decreasing chopper hole size is used. However, in this case, the amount of fine particles generated increases, thus decreasing the strength of superabsorbent polymer and deteriorating the properties.

Thus, the inventors confirmed that by using specific compounds in combination in the step of surface crosslinking, without using a blowing agent during a polymerization process, excellent absorption performance can be realized without increase in fine powders (particles having an average particle diameter of less than about 150 µm) generated by a blowing agent during a polymerization process, and completed the invention.

Specifically, it was confirmed that by using a cyclic carbonate-based compound as a surface crosslinking agent, centrifuge retention capacity and absorbency under pressure of superabsorbent polymer may be improved through the crosslinking mechanism of the cyclic carbonate and the carboxylic group of the superabsorbent polymer, and through the hydrophilic action of the cyclic carbonate and sodium dodecyl sulfate, excellent permeability may be exhibited with rapid initial absorption speed, and simultaneously, excellent absorption performance may be realized. Particularly, the sodium dodecyl sulfate was previously used as a blowing agent in a polymerization step, but in case it is used in a surface crosslinking step instead of a polymerization step, hydrophilic groups may be additionally provided on the surface without increasing generation of fine powders, thereby realizing the aimed effect of the invention.

A Surface Crosslinking Agent

The surface crosslinking agent is a cyclic carbonate-based compound, and allows rapid absorption of water through the hydrophilic action mechanism in the surface crosslinking step, and when used in combination with sodium dodecyl sulfate described below, absorption speed may be further improved.

Representative examples of the surface crosslinking agent may include ethylene carbonate, propylene carbonate, and glycerol carbonate, and the like, and it may be used alone or in combinations of two or more kinds. It is preferable that ethylene carbonate, propylene carbonate and glycerol carbonate are used in combination, because absorption performance may be improved, and particularly, synergistic effect with sodium dodecyl sulfate described below may be maximized.

The surface crosslinking agent may be included in the content of 0.5 to 5.0 parts by weight, preferably 1.0 to 3.0 parts by weight, based on the total 100 parts by weight of the base resin. Within the above content range, excellent absorption performance can be realized, and excellent synergistic effect with sodium dodecyl sulfate component described below can be realized.

Wherein, the content of the surface crosslinking agent, in case corresponding compounds are two or more kinds, means the mixed content thereof.

Meanwhile, if the surface crosslinking agent is included in a small amount outside the above range, a surface crosslinking reaction may not be sufficiently conducted, and thus, centrifuge retention capacity and absorbency under pressure may not be realized to a degree required in the product, and if it is excessively included outside the above content range, centrifuge retention capacity and absorbency under pressure may rapidly decrease.

In case ethylene carbonate, propylene carbonate and glycerol carbonate are used in combination as the surface crosslinking agents, based on 100 parts by weight of the surface crosslinking agents, 10 to 50 parts by weight of ethylene carbonate, 10 to 50 parts by weight of propylene carbonate, and 10 to 50 parts by weight of glycerol carbonate may be included. Preferably, 10 to 20 parts by weight of ethylene carbonate, 10 to 20 parts by weight of propylene carbonate, and 10 to 20 parts by weight of glycerol carbonate may be included.

Within the above content range, excellent absorption performance can be realized, and excellent synergistic effect with sodium dodecyl sulfate described below can be realized.

Meanwhile, if ethylene carbonate is excessively included outside the above content range, centrifuge retention capacity and absorbency under pressure may rapidly decrease, and if propylene carbonate is excessively included outside the above content range, absorbency under pressure may decrease. And, if glycerol carbonate is excessively included outside the above content range, absorbency under pressure may decrease.

The sodium dodecyl sulfate (SDS) was previously used as a blowing agent in the polymerization step of base resin, but it is used in the surface crosslinking step to improve absorption speed through hydrophilic group action mechanism. When sodium dodecyl sulfate is used in the polymerization step, generation of fine powders in the base resin powder increases, thus deteriorating absorption speed, but when it is used in the surface crosslinking step, generation of fine powders is not increased, and thus, absorption speed may be improved through hydrophilic group action mechanisms without deterioration of properties, and yield of the finally prepared product may be also increased. Particularly, when it is used in combination with the above explained surface crosslinking agent, i.e., a cyclic carbonate compound, such an absorption speed improvement effect may be maximized.

The sodium dodecyl sulfate may be included in the content of 0.001 to 1.0 part by weight, preferably 0.05 to 0.5 parts by weight, or 0.01 to 0.3 parts by weight, based on the total 100 parts by weight of the base resin. Within the above content range, excellent absorption performance can be realized, and excellent synergistic effect with the surface crosslinking agent component can be realized. Particularly, it is preferable for the realization of hydrophilic group action mechanism.

Meanwhile, if the sodium dodecy sulfate is included in a small amount outside the above content range, it may be difficult to realize the effect with a very small amount, and particularly, an absorption speed may not be improved, and if it is excessively included outside the above content range, surface tension may decrease, and thus, an absorption speed may become slow to the contrary.

Hereinafter, a method for preparing a superabsorbent polymer composition of one embodiment will be explained according to each step in more detail.

Step of Forming Hydrogel Polymer (Polymerization Step)

In the method for preparing superabsorbent polymer according to one embodiment, first, a step of conducting crosslinking polymerization of water soluble ethylenically unsaturated monomers having acid groups of which at least a part are neutralized, in the presence of an internal crosslinking agent, to form hydrogel polymer, is conducted.

This step comprises mixing the water soluble ethylenically unsaturated monomers, an internal crosslinking agent and a polymerization initiator to prepare a monomer composition, and conducting thermal polymerization or photopolymerization of the monomer composition to form hydrogel polymer.

The water soluble ethylenically unsaturated monomers may be any monomers commonly used for the preparation of superabsorbent polymer. As non-limiting examples, the water soluble ethylenically unsaturated monomer may be a compound represented by the following Chemical Formula 1:

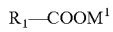   [Chemical Formula 1]

In the Chemical Formula 1, $R_1$ is a C2-5 alkyl group comprising an unsaturated bond, $M^1$ is a hydrogen atom, a monovalent or divalent metal, an ammonium group or an organic amine salt.

Preferably, the monomers may be one or more selected from the group consisting of (meth)acrylic acid, and monovalent (alkali) metal salts, divalent metal salts, ammonium salts and organic amine salts of these acids.

When (meth)acrylic acid or a salt thereof is used as the water soluble ethylenically unsaturated monomer, superabsorbent polymer with improved absorption property may be obtained. In addition, as the monomers, one or more selected from the group consisting of maleic anhydride, fumaric acid, crotonic acid, itaconic acid, 2-acryloylethane sulfonic acid, 2-methacryloylethane sulfonic acid, 2-(meth)acryloylpropane sulfonic acid, 2-(meth)acrylamide-2-methylpropane sulfonic acid, (meth) acrylamide, N-substituted (meth) acrylate, 2-hydroxyethyl (meth)acrylate, 2-hydroxypropyl (meth)acrylate, methoxy polyethylene glycol (meth)acrylate, polyethylene glycol (meth) acrylate, (N,N)-dimethylaminoethyl (meth)acrylate or (N,N)-dimethylaminopropyl (meth)acrylamide, and the like may be used.

Wherein, the water soluble ethylenically unsaturated monomers may have acid groups, and at least a part of the acid groups may be neutralized by a neutralizing agent. Specifically, in the step of mixing the water soluble ethylenically unsaturated monomers, internal crosslinking agent, polymerization initiator and neutralizing agent, at least a part of the acid groups of the water soluble ethylenically unsaturated monomers may be neutralized. Wherein, as the neutralizing agent, basic material such as sodium hydroxide, potassium hydroxide, ammonium hydroxide, and the like, capable of neutralizing acid groups may be used.

And, the neutralization degree of the water soluble ethylenically unsaturated monomers, referring to the degree of neutralization of the acid groups included in the water soluble ethylenically unsaturated monomers by the neutralizing agent, may be 50 to 90 mol %, or 60 to 85 mol %, or 65 to 85 mol %, or 70 to 80 mol %. Although the range of the neutralization degree may vary according to the final properties, if the neutralization degree is too high, neutralized monomers may be precipitated, thus rendering smooth progression of polymerization difficult, and to the contrary, if the neutralization degree is too low, the absorption of the polymer may be significantly lowered, and the polymer may exhibit rubber-like property, which is difficult to handle.

And, as used herein, the term 'internal crosslinking agent' is used to distinguish it from a surface crosslinking agent for crosslinking the surface of base resin as described below, and it performs a function for crosslinking the unsaturated bonds of the above explained water soluble ethylenically unsaturated monomers to polymerize. In this step, crosslinking is progressed without division of the surface or inside, but by the surface crosslinking process described below, particle surface of the finally prepared superabsorbent polymer becomes a structure crosslinked by the surface crosslinking agent, and the inside becomes a structure crosslinked by the internal crosslinking agent.

As the internal crosslinking agent, any compounds may be used as long as it enables introduction of crosslink during the polymerization of the water soluble ethylenically unsaturated monomers. As non-limiting examples, multifunctional crosslinking agents, such as N,N'-methylenebisacrylamide, trimethylolpropane tri(meth)acrylate, ethyleneglycol di(meth)acrylate, polyethyleneglycol (meth) acrylate, propyleneglycol di(meth)acrylate, polypropyleneglycol (meth) acrylate, butanediol di(meth)acrylate, butyleneglycol di(meth)acrylate, diethyleneglycol di(meth)acrylate, hexanediol di(meth)acrylate, triethyleneglycol di(meth) acrylate, tripropyleneglycol di(meth)acrylate, tetraethyleneglycol di(meth)acrylate, dipentaerythritol pentaacrylate, glycerin tri(meth)acrylate, pentaerythritol tetraacrylate, triarylamine, ethyleneglycol diglycidyl ether, propyleneglycol, glycerin, or ethylenecarbonate, may be used alone or in combinations, but the crosslinking agent is not limited thereto. Preferably, ethyleneglycol diglycidyl ether may be used.

The internal crosslinking agent may be used in the content of 0.01 to 5 parts by weight, based on 100 parts by weight of the water soluble ethylenically unsaturated monomers. For example, the internal crosslinking agent may be used in the content of 0.01 parts by weight or more, 0.05 parts by weight or more, 0.1 parts by weight or more, or 0.45 parts by weight or more, and 5 parts by weight or less, 3 parts by weight or less, 2 parts by weight or less, 1 part by weight or less, or 0.7 parts by weight or less, based on 100 parts by weight of the water soluble ethylenically unsaturated monomers. If the content of the internal crosslinking agent is too low, crosslinking may not sufficiently occur, and thus, it may be difficult to realize strength beyond the optimum level, and if the content of the internal crosslinking agent is too high, internal crosslinking density may increase, and thus, it may be difficult to realize desired centrifuge retention capacity.

And, the polymerization initiator may be appropriately selected according to polymerization methods, and in case a thermal polymerization method is used, a thermal polymerization initiator may be used; in case a photopolymerization method is used, a photopolymerization initiator may be used; and in case a hybrid polymerization method (a method using both heat and light) is used, both the thermal polymerization initiator and the photopolymerization initiator may be used. However, even in the case of photopolymerization, since a certain amount of heat is generated by UV irradiation, etc., and heat is generated to some degree according to the progression of an exothermic polymerization reaction, a thermal polymerization initiator may be additionally used.

As the photopolymerization initiator, any compounds capable of forming radicals by light such as UV may be used without limitations.

As the photopolymerization initiator, one or more selected from the group consisting of benzoin ether, dialkyl acetophenone, hydroxyl alkylketone, phenyl glyoxylate, benzyl dimethyl ketal, acyl phosphine, and α-aminoketone may be used. Specific examples of the acyl phosphine may include diphenyl(2,4,6-trimethylbenzoyl)phosphine oxide, phenylbis(2,4,6-trimethylbenzoyl)phosphine oxide, ethyl (2,4,6-trimethylbenzoyl)phenylphosphinate, and the like. More various photopolymerization initiators are described in Reinhold Schwalm, "UV Coatings: Basics, Recent Developments and New Application (Elsevier 2007)", page 115, and are not limited to the above described examples.

And, as the thermal polymerization initiator, at least one selected from the group consisting of a persulfate initiator, an azo initiator, hydrogen peroxide, and ascorbic acid may be used. Specific examples of the persulfate initiator may include sodium persulfate ($Na_2S_2O_8$), potassium persulfate ($K_2S_2O_8$), ammonium persulfate (($NH_4)_2S_2O_8$), etc., and, specific examples of the azo initiator may include 2,2-azobis (2-amidinopropane)dihydrochloride, 2,2-azobis-(N,N-dimethylene)isobutyramidinedihydrochloride, 2-(carbamoylazo)isobutyronitril, 2,2-azobis[2-(2-imidazolin-2-yl) propane]dihydrochloride, 4,4-azobis-(4-cyanovalericacid), etc. More various thermal initiators are described in "Principle of Polymerization (Wiley, 1981)", Odian, page 203, and are not limited to the above described examples.

Such a polymerization initiator may be used in the content of 2 parts by weight or less, based on 100 parts by weight of the water soluble ethylenically unsaturated monomers. Namely, if the concentration of the polymerization initiator is too low, polymerization speed may become slow, and the remaining monomers may be extracted in a large quantity in the final product. To the contrary, if the concentration of the polymerization initiator is too high, the polymer chain making up a network may be shortened, and thus, water soluble content may increase and absorbency under pressure may be lowered, thus deteriorating the properties of polymer.

In addition, the monomer composition may further comprise additives such as a thickener, a plasticizer, a preservation stabilizer, an antioxidant, etc., as necessary.

And, the monomer composition comprising the monomers may be a solution dissolved in a solvent such as water, for example, and a solid content, namely the concentration of the monomers, internal crosslinking agent and polymerization initiator in the solution of the monomer composition may be appropriately controlled considering polymerization time and reaction conditions, and the like. For example, the solid content in the monomer composition may be 10 to 80 wt %, or 15 to 60 wt %, or 20 to 40 wt %.

In case the monomer composition has a solid content of the above range, there is no need to remove unreacted monomers after polymerization using gel effect appeared in the polymerization reaction of a high concentration aqueous solution, and simultaneously, it may be favorable for control of grinding efficiency during grinding of polymer as described below.

Wherein, the solvent that can be used is not limited in terms of its construction as long as it can dissolve or disperse the above explained raw materials, and for example, one or more selected from water, ethanol, ethyleneglycol, diethyleneglycol, triethyleneglycol, 1,4-butanediol, propyleneglycol, ethyleneglycol monobutyl ether, propyleneglycol monomethyl ether, propyleneglycol monomethyl ether acetate, methylethylketone, acetone, methylamylketone, cyclohexanone, cyclopentanone, diethyleneglycol monomethyl ether, diethyleneglycol ethyl ether, toluene, xylene, butyrolactone, carbitol, methylcellosolve acetate and N,N-dimethylacetamide, etc. may be used alone or in combination.

Meanwhile, crosslinking polymerization of the water soluble ethylenically unsaturated monomers having acid groups of which at least a part are neutralized may be progressed without specific limitations, as long as it can form hydrogel polymer by thermal polymerization, photopolymerization or hybrid polymerization.

Specifically, the polymerization method is largely classified into thermal polymerization and photopolymerization according to energy source. Commonly, thermal polymerization may be progressed in a reactor equipped with a stirring axis such as a kneader, and photopolymerization may be progressed in a reactor equipped with a movable conveyer belt, or in a container having a flat bottom, but the above explained polymerization is no more than one example, and the present disclosure is not limited thereto.

For example, hydrogel polymer may be obtained by introducing the above described monomer composition into a reactor equipped with a stirring axis such as a kneader, and supplying hot air or heating the reactor to progress thermal polymerization. Wherein, the hydrogel polymer discharged to the outlet of the reactor may be obtained in the size of a few centimeters to a few millimeters according to the shape of the stirring axis equipped in the reactor. Specifically, the size of obtained hydrogel polymer may vary according to the concentration of the introduced monomer composition and the introduction speed, etc., and commonly, hydrogel polymer with weight average particle diameter of 2 to 50 mm may be obtained.

And, in case photopolymerization is progressed in a reactor equipped with a movable conveyer belt or in a container having a flat bottom as explained above, the obtained hydrogel polymer may be in the form of a sheet having the width of the belt. Wherein, the thickness of the polymer sheet may vary according to the concentration of the introduced monomer mixture and the introduction speed, but, commonly, a monomer mixture is preferably fed such that polymer in the form of a sheet having a thickness of about 0.5 cm to about 5 cm may be obtained. In case a monomer mixture is fed such that the thickness of sheet-shaped polymer may be too thin, production efficiency may be low, and if the thickness of the sheet-shaped polymer is greater than 5 cm, due to the too thick thickness, a polymerization reaction may not uniformly occur throughout the whole thickness.

Wherein, the moisture content of hydrogel polymer obtained by such a method may be about 40 to about 80 wt %. Throughout the specification, the "moisture content" is the content of moisture occupied based on the total weight of hydrogel polymer, and it means a value obtained by subtracting the weight of polymer of a dry state from the weight of hydrogel polymer. Specifically, it is defined as a value calculated by measuring the weight loss according to moisture evaporation in the polymer while raising the temperature of polymer through infrared heating to dry. At this time, the drying condition is set up such that the temperature is raised from room temperature to about 180° C. and then maintained at 180° C., and the total drying time is 40 minutes including a temperature raising step of 5 minutes.

Step of Forming Base Resin Powder

Next, a step of drying, grinding and classifying the hydrogel polymer to obtain base resin powder is progressed.

In this step, hydrogel polymer is dried and ground, and thus, turns into particulate matters, and thereby, the prepared base resin is in the form of powders consisting of crosslinked polymer particles. Specifically, the base resin powders may be crosslinked polymer particles wherein 75 wt % or more, preferably 80 wt % or more, or 90 wt % or more, based on the total weight, have particle diameters of about 150 µm to about 850 µm. Meanwhile, in case a sodium dodecyl sulfate compound used in the surface crosslinking step described below is used in the polymerization step of base resin, fine powders having diameters less than about 150 µm may increase, and strength of superabsorbent polymer may be deteriorated by the fine powders, and due to fine powder increase, yield of the finally prepared superabsorbent polymer may relatively decrease, thus decreasing economical efficiency to a certain degree.

In the step of forming base resin powder, a coarse grinding process may be included before drying the hydrogel polymer so as to increase drying efficiency.

Wherein, grinders that can be used in the coarse grinding are not limited in terms of the constructions, but specifically, one selected from the group consisting of a vertical pulverizer, a turbo cutter, a turbo grinder, a rotary cutter mill, a cutter mill, a disc mill, a shred crusher, a crusher, a chopper, a disc cutter may be used, but are not limited thereto.

Through the coarse grinding step, the particle diameter of the hydrogel polymer may be controlled to about 0.1 to about 10 mm. Grinding to a particle diameter of less than 0.1 mm would not be technically easy due to the high moisture content of the hydrogel polymer, and may generate aggregation between the ground particles. Meanwhile, if grinding to a particle diameter greater than 10 mm, the effect of increasing the efficiency of the subsequent drying step may be insignificant.

The hydrogel polymer coarsely ground as explained above, or hydrogel polymer immediately after polymerization that does not pass through the coarse grinding step is dried, and the drying temperature may be about 60° C. to about 250° C. If the drying temperature is less than about 70° C., a drying time may too lengthen, and the properties of the finally prepared superabsorbent polymer may be deteriorated, and if the drying temperature is greater than about 250° C., only the surface of hydrogel polymer may be dried, thus generating fine powders in the subsequent grinding process, and the properties of the finally prepared superabsorbent polymer may be deteriorated. Preferably, the drying may be progressed at a temperature of about 100 to 240° C., more preferably at 110 to 220° C.

And, the drying may be progressed for about 20 minutes to about 12 hours considering the process efficiency, etc. For example, the hydrogel polymer may be dried for about 10 minutes to 100 minutes or about 20 minutes to about 60 minutes.

And, the drying method is not limited in terms of the construction as long as it can be commonly used as a drying process of hydrogel polymer. Specifically, the drying step may be progressed by hot wind supply, infrared ray irradiation, ultrahigh frequency wave irradiation, or UV irradiation, etc. The polymer dried by such a method may exhibit a moisture content of about 0.1 to about 10 wt %.

And then, a step of grinding dried polymer obtained through the drying step is conducted. The grinding step is to optimize the surface area of dried polymer, and may be conducted such that ground crosslinked polymer may have particles diameter of about 150 µm to about 850 µm. Wherein, the particle diameter of ground crosslinked polymer may be measured according to EDANA WSP 220.3 of EDANA (European Disposables and Nonwovens Association, EDANA) standard.

As a grinder used for grinding, specifically, a pin mill, a hammer mill, a screw mill, a roll mill, a disc mill, or a jog mill, etc. may be used, but the grinder is not limited thereto.

Step of Forming Superabsorbent Polymer Particles (Surface Crosslinking Step)

Next, a step of surface crosslinking the above prepared base resin powders in the presence of a surface crosslinking solution comprising a cyclic carbonate-based surface crosslinking agent and sodium dodecyl sulfate, to form superabsorbent polymer particles, is conducted.

Wherein, the components, contents, action mechanisms of the cyclic carbonate-based surface crosslinking agent and sodium dodecyl sulfate are as explained above.

Meanwhile a method of mixing the cyclic carbonate-based surface crosslinking agent and sodium dodecyl sulfate with the base resin powders is not specifically limited as long as it can uniformly mix them.

For example, the cyclic carbonate-based surface crosslinking agent and sodium dodecyl sulfate may be mixed with the based resin powders in the state of a solution, specifically a surface crosslinking solution dissolved in water. Wherein, the surface crosslinking solution may be prepared by introducing the surface crosslinking agent, sodium dodecyl sulfate compound, and base resin powders in a reactor and mixing, or introducing base resin powders in a mixer and spraying the surface crosslinking agent and sodium dodecyl sulfate compound, or continuously supplying the base resin powders, surface crosslinking agent and sodium dodecyl sulfate compound in a continuously operated mixer and mixing.

Wherein, in case a solid content in the surface crosslinking solution may be 1 wt % or more, 3 wt % or more, 5 wt % or more, 10 wt % or more, and 50 wt % or less, 30 wt % or less, or 20 wt % or less, it may be appropriate to uniformly disperse in the base resin, and simultaneously, aggregation of the base resin powders may be prevented.

Specifically, the surface crosslinking step comprises heat treating a mixture comprising the surface crosslinking solution and base resin powders to form a surface crosslink layer on the surfaces of the base resin powders, thus forming superabsorbent polymer particles. Thereby, on a part of the surfaces of the prepared superabsorbent polymer particles, a surface crosslink layer may be formed by additional crosslinking of the crosslinked polymer by the cyclic carbonate-based surface crosslinking agent and sodium dodecyl sulfate.

Meanwhile, in the surface crosslinking step, the unsaturated bonds of the water soluble ethylenically unsaturated monomers remaining on the surface without being crosslinked in the step of forming hydrogel polymer are crosslinked by the surface crosslinking agent, thus forming superabsorbent polymer with increased surface crosslinking density. By the temperature rise, namely heat treatment process, surface crosslinking density, namely external crosslinking density increases, but internal crosslinking density is not changed, and thus, the prepared superabsorbent polymer including a surface crosslink layer has a structure wherein external crosslinking density is higher than internal crosslinking density.

Meanwhile, the step of forming a surface crosslink layer may be conducted while adding inorganic materials to the mixture. As such inorganic materials, one or more inorganic materials selected from the group consisting of silica, clay, alumina, silica-alumina composite, titania, zinc oxide and aluminum sulfate may be used. The inorganic material may be used in the form of powder or liquid, and particularly, in the form of alumina powder, silica-alumina powder, titania powder, or nano silica solution. And, the inorganic material may be used in the content of about 0.001 to about 1 part by weight, based on 100 parts by weight of the base resin powders.

The temperature of the heat treatment of the mixture, namely the step of surface crosslinking to form superabsorbent polymer particles is not specifically limited, but for example, it may be conducted at 150° C. to 200° C., for 40 to 100 minutes, preferably at 160° C. to 190° C., for 50 to 90 minutes, or at 170° C. to 180° C., for 50 to 70 minutes.

When fulfilling the above described temperature condition of a surface crosslinking process, the surfaces of base resin powders may be sufficiently crosslinked, and simultaneously, by using a cyclic carbonate-based surface crosslinking agent and sodium dodecyl sulfate, generation of fine powders may be reduced, both centrifuge retention capacity and initial absorption speed of superabsorbent polymer may be improved, and excellent effects such as permeability improvement and rewet inhibition, and the like may be obtained.

A temperature rise means for the surface crosslinking reaction is not specifically limited. A heating medium may be supplied, or a heat source may be directly supplied to heat. Wherein, the kinds of the heating medium that can be used may include temperature-increased fluid such as steam, hot air, hot oil, etc., but are not limited thereto, and may be appropriately selected considering the means of the heating medium, temperature rise speed and a temperature to be increased. Meanwhile, the heat source directly supplied may include electric heating, gas heating, etc., but is not limited thereto.

Meanwhile, the preparation method may further comprise a step of classifying the base resin powders consisting of crosslinked polymer on which a surface crosslink layer is formed.

Through the step of classifying base resin powders consisting of crosslinked polymer on which a surface crosslink layer is formed according to particle size, the properties of the finally productized superabsorbent polymer powders may be controlled. It is appropriate that superabsorbent polymer obtained through the grinding and classification processes may have particle diameter of about 150 to 850 μm. More specifically, about 90 wt %, preferably 95 wt % or more of the base resin on which a surface crosslink layer is formed have particle diameters of about 150 to 850 μm.

As the particle diameter distribution of the superabsorbent polymer particles is controlled within a preferable range, the finally prepared superabsorbent polymer may exhibit excellent absorption properties. Thus, in the classification step, polymer having particle diameter of about 150 to about 850 μm may be classified and productized.

The superabsorbent polymer prepared by the above explained preparation method has improved centrifuge retention capacity and absorbency under pressure, and exhibits excellent permeability with rapid initial absorption speed, by simultaneously using the cyclic carbonate-based compound and sodium dodecyl sulfate.

A Superabsorbent Polymer Composition

According to another embodiment of the invention, there is provided a superabsorbent polymer composition prepared by the above explained preparation method.

The superabsorbent polymer composition comprises superabsorbent polymer particles comprising crosslinked polymer of water soluble ethylenically unsaturated monomers having acid groups of which at least a part are neutralized; and further comprises a surface crosslink layer formed by additional crosslinking of the crosslinked polymer by a cyclic carbonate-based surface crosslinking agent and sodium dodecyl sulfate, on at least a part of the surfaces of the superabsorbent polymer particles.

The water soluble ethylenically unsaturated monomers, internal crosslinking agent, cyclic carbonate-based surface crosslinking agent and sodium dodecyl sulfate used in the superabsorbent polymer are as explained above.

Meanwhile, the superabsorbent polymer may have rapid absorption speed due to decrease in the generation of fine powders, without deteriorating the properties such as centrifuge retention capacity and absorbency under pressure, and the like.

For example, the superabsorbent polymer (meaning particles) may have a vortex time of 50 seconds to 65 seconds, preferably 50 seconds to 60 seconds, or 50 seconds to 55 seconds. As the vortex time is smaller, it is more excellent.

The vortex time was measured in the unit of second according to the method described in International Patent Publication No. 1987-003208. Specifically, the vortex time was calculated by introducing 2 g of superabsorbent polymer into 50 mL of saline solution of 23° C. to 24° C., stirring at 600 rpm with a magnetic bar (diameter 8 mm, length 31.8 mm), and measuring a time until vortex disappeared in the unit of seconds. As the time is shorter, superabsorbent polymer has rapid initial absorption speed.

And, the superabsorbent polymer may have centrifuge retention capacity (CRC) measured according to EDANA method WSP 241.3, of about 27 g/g or more, or about 29 g/g or more, or about 30 g/g or more, and about 40 g/g or less, or about 38 g/g or less, or about 35 g/g or less.

And, the superabsorbent polymer may have absorbency under pressure (AUP) of 0.7 psi, measured according to EDANA method WSP 242.3, of 23 g/g or more and 29 g/g or less, 26 g/g or less, or 23 g/g or less.

As explained above, the superabsorbent polymer composition of the present disclosure has excellent absorption performance and rapid initial absorption speed, and thus, can provide high quality hygienic goods.

Hereinafter, the actions and the effects of the invention will be explained in detail through the specific examples. However, these examples are presented only as the illustrations of the invention, and the scope of the right of the invention is not limited thereby.

EXAMPLE

<Preparation of Superabsorbent Polymer>

Example 1

Into a 3 L glass container equipped with a stirrer and a thermometer, 450 g of acrylic acid, 2000 ppm of an internal crosslinking agent polyethyleneglycol diacrylate (PEGDA 400, Mw=400), and 80 ppm of a photoinitiator diphenyl(2, 4,6-trimethylbenzoyl)-phosphine oxide were introduced and dissolved, and then, 618 g of a 31.5% sodium oxide solution was added to prepare an aqueous solution of water soluble unsaturated monomers (neutralization degree: 73 mol %; solid content: 45.1 wt %). When the temperature of the aqueous solution of water soluble unsaturated monomers increased to 40° C. due to neutralization heat, the mixed solution was introduced into a container containing 2400 ppm of a thermal initiator sodium persulfate (SPS), and then, irradiated by UV (irradiation amount: 10 mV/cm$^2$) for 1 minute to conduct UV polymerization, and heated in an oven of 80° C. for 120 seconds to age, thus obtaining a hydrogel polymer sheet. The obtained hydrogel polymer sheet was passed through a chopper having a hole size of 16 mm to prepare crumb. The crumb was dried in an oven capable of transferring wind up and down. Hot air of 185° C. was flowed from the lower part to the upper part for 15 minutes, and from the upper part to the lower part for 15 minutes, to uniformly dry, such that the moisture content after drying became 2% or less. After the drying process, by classification with a sieve of ASTM standard, base resin powders having particle sizes of 150 to 850 μm were obtained.

And then, based on 100 parts by weight of the prepared base resin powders, 0.6 parts by weight of ethylene carbonate, 0.6 parts by weight of propylene carbonate, 0.6 parts by weight of propylene glycol, 0.6 parts by weight of glycerol carbonate, 0.4 parts by weight of aluminum sulfate, 0.005 parts by weight of sodium dodecyl sulfate, and 5.4 parts by weight of water were mixed to prepare a surface crosslinking solution.

And then, the surface crosslinking solution was sprayed to the base resin powders, and mixed while stirring at room temperature at 1000 rpm for 30 seconds such that the surface crosslinking solution was uniformly distributed on the base resin powders. Subsequently, the base resin powders mixed with the surface crosslinking solution was introduced into a surface crosslinking reactor and a surface crosslinking reaction was progressed. In the surface crosslinking reactor, it was confirmed that the temperature of the base resin powders gradually increased from the initial temperature around 80° C., and it was operated such that the temperature reached to the maximum reaction temperature of 188° C. after 40 minutes. After reaching the maximum reaction temperature, additional reaction was progressed for 30 minutes, and then, the finally prepared superabsorbent polymer sample was taken. After the surface crosslinking process, the superabsorbent polymer was classified with an ASTM standard sieve so as to have particle diameters of 150 μm to 850 μm.

Examples 2 to 10 and Comparative Examples 1 to 4

Superabsorbent polymer compositions were prepared by the same method as Example 1, except that the components and contents described in the following Table 1 were used.

TABLE 1

| | Surface crosslinking agent* | | | surfactant | Other additives* |
|---|---|---|---|---|---|
| | EC | PC | GC | SDS | 1,3-PD |
| Example 1 | 0.6 | 0.6 | 0.6 | 0.005 | — |
| Example 2 | 0.6 | 0.6 | 0.6 | 0.01 | — |
| Example 3 | 0.6 | 0.6 | 0.6 | 0.02 | — |
| Example 4 | 0.8 | 0.6 | 0.6 | 0.01 | — |
| Example 5 | 0.6 | 0.8 | 0.6 | 0.01 | — |
| Example 6 | 0.6 | 0.6 | 0.8 | 0.01 | — |
| Example 7 | 1.8 | — | — | 0.01 | — |
| Example 8 | — | — | 1.8 | 0.01 | — |
| Example 9 | 0.9 | 0.9 | — | 0.01 | — |
| Example 10 | 0.9 | 0.9 | 0.01 | — | — |
| Comparative Example 1 | 0.6 | 0.6 | 0.6 | — | — |
| Comparative Example 2 | — | — | — | 0.01 | — |
| Comparative Example 3 | — | — | — | 0.01 | 0.3 |
| Comparative Example 4 | 0.6 | 0.6 | 0.6 | — | 0.3 |

Surface crosslinking agent, surfactant and other additives are based on 100 parts by weight of the base resin.
EC: Etylene carbonate
PC: Propylene carbonate
GC: Glycerol carbonate
SDS: Sodium dodecyl sulfate
1,3-PD: 1,3-propanediol

EXPERIMENTAL EXAMPLE

For the superabsorbent polymer compositions prepared in Examples and Comparative Examples, properties were evaluated as follows, and the results were shown in Table 2.

Unless otherwise described, the following property evaluations were progressed at room temperature (25° C.), and a saline solution or brine means a 0.9 wt % sodium chloride (NaCl) aqueous solution.

(1) Centrifuge Retention Capacity (CRC)

Among the superabsorbent polymers, those having particles diameters of 150 to 850 μm were selected, and centrifuge retention capacity (CRC) by absorption rate under no load was measured according to EDANA WSP 241.3 of EDANA (European Disposables and Nonwovens Association) standard.

Specifically, among the polymers respectively obtained in Examples and Comparative Examples, polymers classified with #30-50 sieve were obtained. W0 (g, about 0.2 g) of the polymers were uniformly put in an envelope made of non-woven fabric, and the envelope was sealed, and then, soaked in a 0.9 wt % sodium chloride aqueous solution (saline solution) at room temperature. After 30 minutes, the envelope was drained at 250 G for 3 minutes using a centrifuge, and then, the weight W2 (g) of the envelope was measured. And, after the same operation using an empty envelope without a sample, the weight W1 (g) at that time was measured. Using the obtained weights, CRC (g/g) was calculated according to the following Formula.

CRC (g/g)={[$W2$ (g)−$W1$ (g)]/$W0$ (g)}−1   [Mathematical Formula 2]

(2) Absorbency Under Pressure (AUP)

Absorbency under pressure of 0.7 psi of each polymer was measured according to EDANA method WSP 242.3. When measuring absorbency under pressure, the classified resin powders used when measuring CRC were used.

Specifically, a 400 mesh wire netting made of stainless was installed on the bottom of a plastic cylinder with an inner diameter of 25 mm. Under the conditions of room temperature and relative humidity of 50%, W0 (g, 0.16 g) of superabsorbent polymer were uniformly scattered on the wire netting, and a piston that can uniformly give a load of 0.7 psi (or 0.3, 0.9 psi) was put on the superabsorbent polymer. Wherein, as the piston, a piston having an outer diameter slightly smaller than 25 mm was used such that there was no gap with the inner wall of the cylinder, and the movement upward and downward was not hindered. At this time, the weight W3 (g) of the apparatus was measured.

Subsequently, on the inner side of a petri dish with a diameter of 150 mm, a glass filter with a diameter of 90 mm and a thickness of 5 mm was positioned, and a 0.90 wt % sodium chloride aqueous solution (saline solution) was poured on the petri dish. Here, the saline solution was poured until the water level of the saline solution became horizontal to the upper side of the glass filter. And, one filter paper with a diameter of 90 mm was put thereon. On the filer paper, the above prepared apparatus was mounted, and the liquid was absorbed for 1 hour. After 1 hour, the weight W4 (g) was measured.

Using the measured weights, absorbency under pressure (g/g) was calculated according to the following Formula.

AUP (g/g)=[$W4$ (g)−$W3$ (g)]/$W0$ (g)   [Mathematical Formula 3]

(3) Vortex Time

The vortex times of the superabsorbent polymers of Examples and Comparative Examples were measured in the unit of second according to the method described in International Patent Publication No. 1987-003208.

Specifically, the vortex time was calculated by introducing 2 g of superabsorbent polymer into 50 mL of saline solution of 23° C. to 24° C., stirring at 600 rpm with a magnetic bar (diameter 8 mm, length 31.8 mm), and measuring a time until vortex disappeared in the unit of seconds.

The property values of the superabsorbent polymers after surface crosslinking of Examples and Comparative Examples were described in the following Table 2.

TABLE 2

|  | CRC (g/g) | Vortex time (sec) | 0.7 AUP (g/g) |
| --- | --- | --- | --- |
| Example 1 | 32.6 | 61 | 25.2 |
| Example 2 | 32.6 | 54 | 25.3 |
| Example 3 | 32.5 | 51 | 25.1 |
| Example 4 | 31.0 | 55 | 24.0 |
| Example 5 | 31.2 | 56 | 22.0 |
| Example 6 | 32.1 | 53 | 25.5 |
| Example 7 | 32.3 | 65 | 24.2 |
| Example 8 | 33.1 | 59 | 22.0 |
| Example 9 | 32.2 | 63 | 25.5 |
| Example 10 | 32.0 | 65 | 22.9 |
| Comparative Example 1 | 32.1 | 67 | 25.6 |
| Comparative Example 2 | 40.0 | 55 | 12.2 |
| Comparative Example 3 | 32.2 | 62 | 21.1 |
| Comparative Example 4 | 29.0 | 70 | 22.6 |

Referring to Table 2, it can be confirmed that the superabsorbent polymer compositions prepared using a cyclic carbonate-based surface crosslinking agent and sodium dodecyl sulfate in the surface crosslinking step according to the preparation method of the present disclosure exhibit excellent absorption performance.

In the case of Comparative Examples wherein a cyclic carbonate-based surface crosslinking agent and/or sodium dodecyl sulfate were not used in the surface crosslinking step, it was confirmed that centrifuge retention capacity and absorbency under pressure were deteriorated, and particularly, vortex time remarkably increased.

In the case of Comparative Examples 2 and 3, it was confirmed that surface crosslinking were not sufficiently progressed, and thus, although absorption speed were equivalent to Examples, absorption under pressure was remarkably deteriorated.

What is claimed is:

1. A method for preparing a superabsorbent polymer composition comprising:

conducting crosslinking polymerization of water soluble ethylenically unsaturated monomers having acid groups of which at least a part are neutralized, in the presence of an internal crosslinking agent, to form a hydrogel polymer;

drying, grinding and classifying the hydrogel polymer to obtain a base resin powder; and surface crosslinking the base resin powder by incorporating a surface crosslinking solution comprising a cyclic carbonate-based surface crosslinking agent and sodium dodecyl sulfate to form superabsorbent polymer particles, wherein the cyclic carbonate-based surface crosslinking agent comprises a combination of ethylene carbonate, propylene carbonate, and glycerol carbonate, the cyclic carbonate-based surface crosslinking agent is included in a content of 0.5 to 5 parts by weight, based on a total 100 parts by weight of the base resin, and the sodium dodecyl sulfate is included in a content of 0.001 to 1.0 part by weight, based on the total 100 parts by weight of the base resin.

2. The method for preparing a superabsorbent polymer composition according to claim 1, wherein the cyclic carbonate-based surface crosslinking agent comprises 10 to 50 parts by weight of ethylene carbonate, 10 to 50 parts by weight of propylene carbonate, and 10 to 50 parts by weight of glycerol carbonate.

3. The method for preparing a superabsorbent polymer composition according to claim 1, wherein the surface crosslinking to form the superabsorbent polymer particles is conducted at 150° C. to 200° C. for 40 to 100 minutes.

* * * * *